Figure 1A:
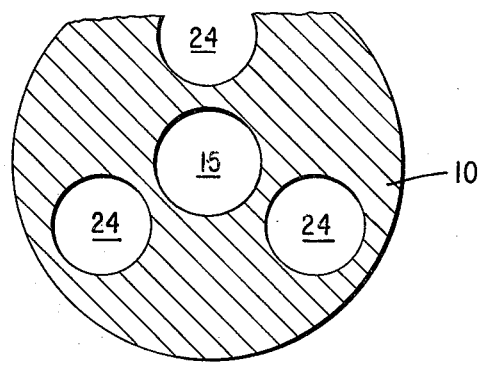

United States Patent [19]
Frötschner

[11] 3,942,613
[45] Mar. 9, 1976

[54] HYDRODYNAMIC BRAKE, ESPECIALLY FOR MOTOR VEHICLES

[75] Inventor: Eberhardt K. Frötschner, Gerlingen, Germany

[73] Assignee: Daimler-Benz Aktiengesellschaft, Germany

[22] Filed: Aug. 7, 1970

[21] Appl. No.: 62,061

[30] Foreign Application Priority Data
  Aug. 9, 1969 Germany............................ 1940739

[52] U.S. Cl................... 188/296; 60/337; 192/3.21
[51] Int. Cl.².......................................... F16D 57/02
[58] Field of Search........ 188/296; 60/54; 415/53 T, 415/199 T, 213 T; 192/3.21

[56] References Cited
UNITED STATES PATENTS

| | | |
|---|---|---|
| 2,649,690 | 8/1953 | Oding ..................................... 60/54 |
| 2,870,875 | 1/1959 | Cline............................... 188/296 X |
| 3,095,820 | 7/1963 | Sanborn et al................... 188/296 X |
| 3,398,818 | 8/1968 | Hensel ............................. 188/296 X |
| 3,476,219 | 11/1969 | Lauer................................... 188/296 |

FOREIGN PATENTS OR APPLICATIONS
954,952   4/1964   United Kingdom................. 188/296

Primary Examiner—George E. A. Halvosa
Attorney, Agent, or Firm—Craig & Antonelli

[57] ABSTRACT

A hydrodynamic brake for vehicles, particularly for motor vehicles which includes at least one stationary blade wheel and at least one rotating blade wheel whose blades have any desired blade angle and have an external circulation for the working liquid provided possibly with a cooler; the working liquid leaves the working circulation substantially tangentially at least at the discharge and under utilization of the dynamic pressure by way of one or several discharge apertures provided in the stationary blade wheel which extend parallel to the blade angle; the discharge apertures are each provided with an outer boundary starting from the largest circumference of the stationary blade wheel or in direct proximity thereto and discharging into a possibly annularly shaped discharge channel arranged axially adjacent the working circulation.

16 Claims, 2 Drawing Figures

U.S. Patent  March 9, 1976  3,942,613

INVENTOR
EBERHARDT FRÖTSCHNER

BY Craig, Antonelli, Stewart & Hill
ATTORNEYS

HYDRODYNAMIC BRAKE, ESPECIALLY FOR MOTOR VEHICLES

The present invention relates to a hydrodynamic brake (retarder) for vehicles, especially for motor vehicles with at least one fixed and at least one rotating blade wheel, whose blades have any desired blade angle and with an outer circulation for the working liquid containing possibly a cooler, whereby the working liquid leaves the working circulation essentially tangentially at least at the discharge and under utilization of the dynamic pressure.

A hydrodyanmic brake has to fulfill essentially two tasks; namely, (1) to achieve the necessary brake deceleration, and (2) to carry off the heat quantities occurring at that time, for which purposes possibly a separate cooling system may be interconnected in the external circulation. Whereas the necessary braking effect is achieved far-reachingly by corresponding design of the shape and of the blading, one can assure the through-flow of the working liquid necessary for carrying off the resulting heat quantities only by a correct selection of the location and dimension of the inlet and discharge apertures.

Retarder constructions are known in the prior art in which the working liquid enters into the inner flow core of the retarder and the discharge has been located outside of the bladed wheels in the circumferential direction in order that, on the one hand, the low pressure present in the flow core and, on the other, the maximum static pressure at the largest diameter resulting from the centrifugal force are utilized. Furthermore, retarders are known in the prior art in which the effective vertical center section or meridian section is located or placed on a larger diameter in order to increase the centrifugal force effect at the discharge. However, increased ventilation losses occur thereby in the disengaged condition.

With the hydrodynamic brakes mentioned hereinabove, the dynamic pressure (velocity head) belonging to the circulating flow is utilized instead of the static pressure (centrifugal force pressure). Since the absolute velocities occurring in the retarder may increase to a multiple of the highest circumferential velocity, a considerably higher through-flow quantity can be also achieved with the dynamic pressure resulting therefrom. In one prior art hydrodynamic brake of this type, an annular channel is placed externally about the working circulation—similar as in a centrifugal pump—in which the working liquid enters through a gap between the outer edge of the rotating shell and the outer edge of the stationary shell. However, this hydrodynamic brake has a considerable diameter by reason of the externally extending discharge channel which in particular impairingly opposes a use thereof in the motor vehicle. Additionally, the working liquid impinges during the discharge on the edge of the stationary blade wheel so that eddy losses may occur at this place.

The present invention is concerned with the task to avoid the described disadvantages and to provide above all a hydrodynamic brake which is particularly well-suited for the use in the motor vehicle. The underlying problems are solved with the brakes of the aforementioned type in accordance with the present invention in that one or several discharge apertures extend in the fixed blade or vane wheel parallel to the blade angle and starts or start with the external boundary thereof from the largest diameter of the fixed vane wheel or in direct proximity thereto, and in that the discharge aperture or apertures terminate in a possibly annularly shaped discharge channel arranged axially adjacent the working circulation.

The entire hydrodynamic brake receives a considerably more compact construction by the design in accordance with the present invention. It can be better incorporated into the power train of a motor vehicle by reason of its smaller diameter.

Additionally, the transition from the working circulation to the discharge channel extends considerably more harmoniously and without impact on special or separate edges so that eddy losses can be avoided.

With one type of construction according to the present invention, the inner boundary of the discharge aperture or apertures are located radially inwardly of the mean diameter of the discharge channel and possibly also of the working circulation. In this manner, one obtains relatively large discharge apertures so that the flow may enter completely unimpaired into the discharge channel. Furthermore, a construction is preferred thereby in which the discharge channel extends along a smaller radius than the working circulation and in which the discharge aperture or apertures begin directly adjacent the outer beginning of the fixed blading and extend under a slight inclination inwardly up to the discharge channel.

A further feature of the present invention resides in that at the rotating vane wheel the radially outer boundary of the working circulation is disposed on a slightly smaller diameter than at the stationary blade or vane wheel. In this manner, a very slight step results at the transition between the two vane wheels so that the flow leaving the rotating vane or blade wheel under no circumstances can break itself at the edge of the stationary blade wheel. Incidentally, this construction can also be applied analogously to the inner circumference of the working circulation.

The concept to utilize the dynamic pressure can also be extended, of course, to the inlet of the working liquid. A further development of the inventive concept therefore resides in that at least one inlet aperture is arranged in the rotating blade wheel within the inner area of the working circulation which terminates tangentially in the working circulation. A further feature is thereby considered to reside in that this inlet aperture extends essentially radially from the inside toward the outside and in that a separate blading for the pre-acceleration of the working fluid is arranged in the hub portion of the rotating blade wheel upstream of the inlet aperture. This separate blading may have a predetermined angle which is naturally matched to the blade angle at the discharge of the inlet aperture into the interior of the working circulation.

Accordingly, it is an object of the present invention to provide a hydrodynamic brake, especially for motor vehicles, which avoids by simple means the aforementioned shortcomings and drawbacks encountered in the prior art.

Another object of the present invention resides in a hydrodynamic brake, particularly for motor vehicles, which has a relatively compact construction with small diametric dimensions, thereby favoring its installation in motor vehicles.

A further object of the present invention resides in a hydrodynamic brake which minimizes eddy losses in the transition from the working circulation to the discharge channel.

Figure 1:
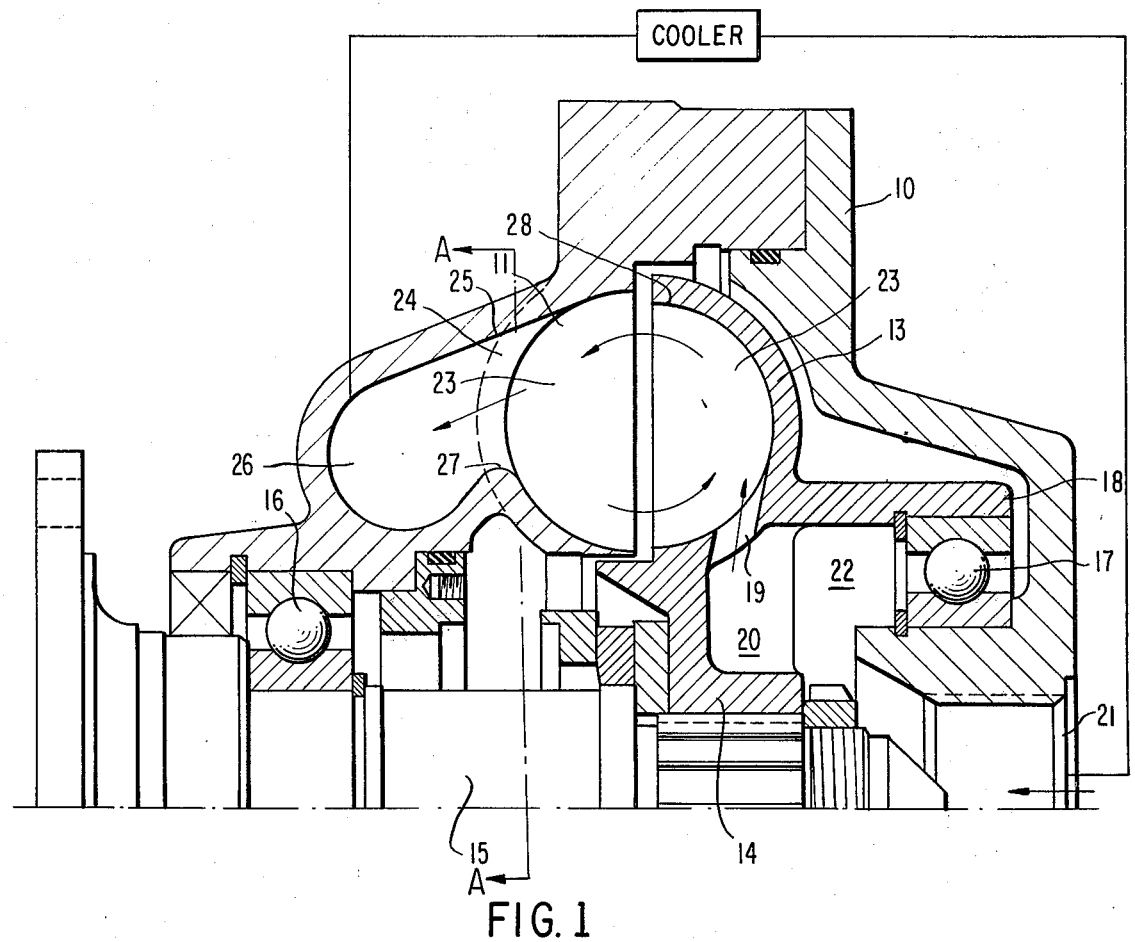

These and further objects, features, and advantages of the present invention will become more obvious from the following description when taken in connection with the accompanying drawing which shows, for purposes of illustration only, one embodiment in accordance with the present invention, and wherein:

FIG. 1 is an axial longitudinal cross-sectional view through one-half of a hydrodynamic brake in accordance with the present invention, the other half being of symmetrical construction; and FIG. 1A is a schematic cross-sectional view taken in the direction of A—A of FIG. 1 which schematically shows a plurality of discharge apertures 24 arranged in the housing.

Referring now to the drawing, reference numeral 10 designates a housing in which is arranged a stationary blade or vane wheel 11 whose blading may be cast integral with the corresponding housing part. This blading has a predetermined blade angle which is advantageously of the order of magnitude of about 50°. Opposite the stationary blade wheel 11 is arranged a rotating blade or vane wheel 13 which is provided with a corresponding blading. Preferably the bladings are positioned at both wheels at an inclination in the forward direction of rotation. The rotating blade wheel 13 is secured with its hub portion 14 on the drive shaft 15 which, in its turn, is supported in the housing 10 by a bearing 16. A further bearing 17 additionally serves also for the support of the rotating blade wheel 13 with the aid of an axially extended annular sleeve 18.

Several inlet apertures 19 uniformly distributed over the circumference are arranged in the rotating blade wheel 13 within the inner area thereof. These inlet apertures 19 extend essentially radially from the inside toward the outside, and more particularly, in such a manner that they discharge tangentially into the working space 23. Additionally, they have the same inclination as the blades at the stationary blade wheel 11. Separate special blades 20 are arranged between the hub portion 14 and the wheel body which are also positioned correspondingly inclined. The working fluid enters axially through the opening 21 into the housing and flows then out of the annular space 22 through the described inlet apertures 19 into the working space 23.

One or also several discharge apertures 24 are provided in the stationary blade wheel 11 whose outer boundary 25 begins directly adjacent the outer circumference of the stationary blading and extends tangentially slightly downwardly up to a discharge channel 26 that is arranged axially adjacent the working space 23 and on a slightly smaller diameter than the latter. The inner boundary 27 of the discharge aperture 24 is disposed radially inwardly of the meridian plane of the working space 23. The working liquid therefore enters with its own absolute velocity tangentially from the working space 23 through the discharge aperture 24 into the outlet channel 26. The dynamic pressure is therefore utilized in connection therewith. A cooler is schematically illustrated in FIG. 1 between the discharge channel and the inlet for cooling the discharged working fluid.

The rotating shell 13 has at its outer circumference 28 a slightly smaller diameter than the stationary blade wheel 11 at the same place. Hence, a very small step results thereat so that the liquid centrifuged out of the rotating blade wheel, with certainty cannot impinge on any edge or end face at the stationary blade wheel that may be disposed possibly in its path.

While I have shown and described only one embodiment in accordance with the present invention, it is understood that the same is not limited thereto, but is susceptible of numerous changes and modifications as known to those skilled in the art, and I therefore do not wish to be limited to the details shown and described herein but intend to cover all such changes and modifications as are encompassed by the scope of the appended claims.

I claim:

1. A hydrodynamic brake for vehicles comprising: housing means, rotating blade wheel means operatively connectible to a rotating shaft to be braked, said rotating blade wheel means having a plurality of blade means attached thereto, stationary blade wheel means having a plurality of blade means attached thereto, said rotating wheel means and said stationary wheel means being disposed in said housing means with their respective blade means facing one another to form a working circulation space therebetween, the respective blade means of said stationary and rotating wheel means being so arranged that introduction of a liquid medium to the working circulation space causes effective transfer of braking forces from said stationary wheel means to said rotating wheel means due to relative rotation of the liquid between the respective blade means of the two wheels, inlet aperture means for introducing the liquid medium to the working circulation space, discharge aperture means for discharging the liquid medium from the working circulation space, and discharge channel means for conducting the liquid medium away from the discharge aperture means, said discharge aperture means extending through the stationary wheel means in a direction approximately parallel to the blade angle of the blade means on said stationary wheel means such that the liquid medium is discharged tangentially utilizing the dynamic pressure imparted to the liquid medium in the working circulation space, whereby the necessary brake deceleration forces can be carried out by the liquid medium and the heat developed in said liquid medium during the braking operation can be transferred away from the working circulation space, characterized in that said inlet aperture means includes at least one inlet aperture arranged in the rotating blade wheel within the inner area of the working circulation space, and in that the inlet aperture means terminates substantially tangentially into the working circulation space.

2. A hydrodynamic brake according to claim 1, characterized in that the discharge channel means has an approximately circular cross-section, and in that the inner boundary of the discharge aperture means is disposed radially inwardly of the mean diameter of the discharge channel means.

3. A hydrodynamic brake according to claim 1, characterized in that the discharge channel means extends on a smaller radius with respect to the axis of rotation of the rotating wheel means than the working circulation space and that the discharge aperture means begins directly adjacent the outer circumference of the stationary blade wheel means and extends inwardly to the discharge channel means under a slight inclination.

4. A hydrodynamic brake according to claim 1, characterized in that each inlet aperture extends essentially radially with respect to the axis of rotation of the rotating wheel means from the inside toward the outside and in that a separate blading for the pre-acceleration of the working liquid is arranged in the hub portion of the rotating wheel means upstream of the inlet aperture means.

5. A hydrodynamic brake according to claim 1, characterized in that said discharge channel means extends along said working circulation space in a direction perpendicular to the axis of rotation of said rotating wheel means, and in that said discharge channel means is enclosed within said housing means and is bounded by said stationary wheel means and by internal walls of said housing means.

6. A hydrodynamic brake according to claim 1, characterized in that the blade means of said stationary wheel means correspond in number to the blade means of said rotating wheel means.

7. A hydrodynamic brake for vehicles comprising: housing means, rotating blade wheel means operatively connectible to a rotating shaft to be braked, said rotating blade wheel means having a plurality of blade means attached thereto, stationary blade wheel means having a plurality of blade means attached thereto, said rotating wheel means and said stationary wheel means being disposed in said housing means with their respective blade means facing one another to form a working circulation space therebetween, the respective blade means of said stationary and rotating wheel means being so arranged that introduction of a liquid medium to the working circulation space causes effective transfer of braking forces from said stationary wheel means to said roating wheel means due to relative rotation of the liquid between the respective blade means of the two wheels, inlet aperture means for introducing the liquid medium to the working circulation space, discharge aperture means for discharging the liquid medium from the working circulation space, and discharge channel means for conducting the liquid medium away from the discharge aperture means, said discharge aperture means extending through the stationary wheel means in a direction approximately parallel to the blade angle of the blade means on said stationary wheel means such that the liquid medium is discharged tangentially utilizing the dynamic pressure imparted to the liquid medium in the working circulation space, whereby the necessary brake deceleration forces can be carried out by the liquid medium and the heat developed in said liquid medium during the braking operation can be transferred away from the working circulation space, characterized in that the working circulation space is shaped as an approximately circular cross-section annulus extending concentrically around the axis of rotation of the rotating wheel means, said working circulation space having a mean diameter extending parallel to said axis and disposed halfway between the inner and outermost radial extent of said working circulation space with respect to said axis, and in that said discharge channel means is shaped as an annulus with a curved cross-section and extending around the axis of rotation of the rotating wheel means, said discharge channel means having a mean diameter extending parallel to said axis and disposed halfway between the inner and outermost radial extent of said discharge channel means with respect to said axis, and in that the inner boundary of the discharge aperture means with respect to said axis is disposed radially inwardly of the mean diameter of the discharge channel means with respect to said axis.

8. A hydrodynamic brake according to claim 7, characterized in that the inner boundary of the discharge aperture means is disposed radially inwardly of the mean diameter of the working circulation space with respect to said axis.

9. A hydrodynamic brake according to claim 8, characterized in that the mean diameter of the discharge channel means is on a smaller radius than the mean diameter of the working circulation space with respect to said axis and that the discharge aperture means begins directly adjacent the outer circumference of the stationary blade means and extends inwardly to the discharge channel means under a slight inclination.

10. A hydrodynamic brake according to claim 9, characterized in that the radially outer boundary of the working circulation space with respect to said axis is slightly smaller adjacent the rotating wheel means than adjacent the stationary wheel means whereby fluid passing from the rotating wheel means to the stationary wheel means is prevented from impinging directly on the outer portion of the stationary wheel means.

11. A hydrodynamic brake according to claim 10, characterized in that said inlet aperture means includes at least one inlet aperture arranged in the rotating blade wheel within the inner area of the working circulation space, and in that the inlet aperture means terminates substantially tangentially into the working circulation space.

12. A hydrodynamic brake according to claim 11, characterized in that each inlet aperture extends essentially radially with respect to the axis of rotation of the rotating wheel means from the inside toward the outside, and in that a separate blading for the pre-acceleration of the working liquid is arranged in the hub portion of the rotating wheel means upstream of the inlet aperture means.

13. A hydrodynamic brake according to claim 12, characterized in that the discharge aperture means start substantially from the largest circumference of the stationary wheel means.

14. A hydrodynamic brake according to claim 13, characterized in that the blade means have a predetermined desired blade angle.

15. A hydrodynamic brake according to claim 13, characterized in that a cooler means is provided for cooling the fluid medium, said cooler means being arranged externally of said working circulation space.

16. A hydrodynamic brake according to claim 13, characterized in that the discharge aperture means include several discharge apertures provided in the stationary blade wheel.

* * * * *